US009972358B2

(12) United States Patent
Wu et al.

(10) Patent No.: US 9,972,358 B2
(45) Date of Patent: May 15, 2018

(54) INTERACTIVE VIDEO GENERATION (71) Applicant: Futurewei Technologies, Inc., Plano, TX (US)

(72) Inventors: Zonghuan Wu, Cupertino, CA (US); Murat Kalender, Istanbul (TR); Can Kansin, Istanbul (TR); Ozgun Cirakman, Istanbul (TR); Mustafa Tolga Eren, Istanbul (TR); Caglar Tirkaz, Istanbul (TR); Gunay Gultekin, Istanbul (TR); Sezer Kutluk, Istanbul (TR)

(73) Assignee: Futurewei Technologies, Inc., Plano, TX (US)

( * ) Notice: Subject to any disclaimer, the term of this patent is extended or adjusted under 35 U.S.C. 154(b) by 118 days.

(21) Appl. No.: 14/920,523

(22) Filed: Oct. 22, 2015

(65) Prior Publication Data

US 2016/0118083 A1  Apr. 28, 2016

Related U.S. Application Data

(60) Provisional application No. 62/067,327, filed on Oct. 22, 2014.

(51) Int. Cl.
| | |
|---|---|
| *H04N 5/93* | (2006.01) |
| *G11B 27/00* | (2006.01) |
| *G11B 27/034* | (2006.01) |
| *G11B 27/34* | (2006.01) |
| *G11B 27/031* | (2006.01) |

(Continued)

(52) U.S. Cl.
CPC .......... *G11B 27/034* (2013.01); *G11B 27/031* (2013.01); *G11B 27/34* (2013.01); *H04N 21/4722* (2013.01); *H04N 21/854* (2013.01); *H04N 21/8543* (2013.01)

(58) Field of Classification Search
USPC ................................................. 386/28–284
See application file for complete search history.

(56) References Cited

U.S. PATENT DOCUMENTS

| | | | |
|---|---|---|---|
| 2003/0007397 A1* | 1/2003 | Kobayashi | G06F 17/24 365/200 |
| 2007/0005795 A1 | 1/2007 | Gonzalez | |

(Continued)

FOREIGN PATENT DOCUMENTS

| | | |
|---|---|---|
| CN | 101075891 A | 11/2007 |
| CN | 101246491 A | 8/2008 |

*Primary Examiner* — Nigar Chowdhury
(74) *Attorney, Agent, or Firm* — Futurewei Technologies, Inc.

(57) ABSTRACT

Various videolization solutions are provided. A method for generating video is provided according to an example. The method includes obtaining one or more data portions and generating a customizable video using the one or more data portions and using one or more video generation templates; determining one or more selectable objects in the customizable video using one or more object definitions; receiving an indication indicating a user selection of at least one selectable object corresponding to an object definition; obtaining additional data portions related to the at least one selectable object corresponding to the indication; and regenerating the customizable video using the additional data portions and the one or more data portions corresponding to the indication.

20 Claims, 6 Drawing Sheets

(51) Int. Cl.
*H04N 21/4722* (2011.01)
*H04N 21/854* (2011.01)
*H04N 21/8543* (2011.01)

(56) References Cited

U.S. PATENT DOCUMENTS

| | | | |
|---|---|---|---|
| 2008/0046956 A1* | 2/2008 | Kulas | H04N 21/4725 725/136 |
| 2008/0193099 A1* | 8/2008 | Nakai | G11B 27/034 386/281 |
| 2009/0019487 A1* | 1/2009 | Kulas | H04N 5/44543 725/41 |
| 2009/0210790 A1 | 8/2009 | Thomas | |
| 2010/0050082 A1 | 2/2010 | Katz et al. | |
| 2010/0242073 A1 | 9/2010 | Gordon et al. | |
| 2010/0260468 A1* | 10/2010 | Khatib | G06F 11/0757 386/278 |
| 2011/0179012 A1* | 7/2011 | Pedersen | G06F 17/30864 707/710 |
| 2014/0161354 A1* | 6/2014 | Curcio | G06K 9/00718 382/190 |
| 2014/0226955 A1* | 8/2014 | Man | H04N 9/79 386/285 |

* cited by examiner

```xml
<?xml version="1.0" encoding="UTF-8"?>
<movie>
    <scene>
        <primary>audio</primary>
        <visual>
            <type>serial</type>
            <item>
                <type>image</type>
                <filename>Fight_Club_en1.jpg
                </filename>
            </item>
        </visual>
        <audio>
            <type>serial</type>
            <item>
                <type>tts</type>
                <filename>Fight_Club_en.wav
                </filename>
            </item>
        </audio>
    </scene>
    <scene>
        <primary>visual</primary>
        <visual>
            <type>serial</type>
            <item>
                <type>video</type>
                <filename>Fight_Club_en.mp4
                </filename>
            </item>
        </visual>
    </scene>
</movie>
```

INTERACTIVE VIDEO GENERATION

This application claims the benefit of U.S. Provisional Application No. 62/067,327, filed on Oct. 22, 2014, entitled "Integrated, Intelligent and Interactive Internet Streamlization" which application is hereby incorporated herein by reference.

TECHNICAL FIELD

The present invention relates to a system and method for video generation.

BACKGROUND

A multimedia platform may be a television (TV), a set-top-box (STB), a mobile device, a personal computer (PC), a smart watch, a smart pair of glasses, a smart mirror, a car multimedia screen etc. A videolized platform may provide a framework that converts a content into personalized video content on a multimedia environment such as the multimedia platform. Videolization system is a system that provides such a videolized platform.

Various videolization systems are provided through a plurality of applications, for example, mobile applications, Internet applications, etc. Some videolization systems obtain data resources mainly from the Internet such as in performance of comparison shopping, search engine operations, online screen plays, virtual personal assistants and social media.

SUMMARY

A method for generating video is provided according to an example. The method includes obtaining one or more data portions and generating a customizable video using the one or more data portions and using one or more video generation templates, determining one or more selectable objects in the customizable video using one or more object definitions, receiving an indication indicating a user selection of at least one selectable object corresponding to an object definition, obtaining additional data portions related to the at least one selectable object corresponding to the indication, and regenerating the customizable video using the additional data portions and the one or more data portions corresponding to the indication.

A video processing device is provided according to an example. The device includes a memory storing instructions and a processor coupled to the memory. The processor reads and executes the instructions to obtain one or more data portions and generate a customizable video using the one or more data portions and using one or more video generation templates, determine one or more selectable objects in the customizable video using one or more object definitions, receive an indication indicating a user selection of at least one selectable object corresponding to an object definition, obtain additional data portions related to the at least one selectable object corresponding to the indication, and regenerate the customizable video using the additional data portions corresponding to the indication.

BRIEF DESCRIPTION OF THE DRAWINGS

For a more complete understanding of the present invention, and the advantages thereof, reference is now made to the following descriptions taken in conjunction with the accompanying drawings.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Autonomous video generation allows users to dynamically interact with a variety of applications using videolization and means of interactions between human and a computer.

An element in a video can be a dynamic composition that comprises images, video clips, audio clips, text visuals, background music, and/or human or synthetic voice-over about the video etc.

A media element feature may include a feature for text, audio, video, image, or combinations thereof. The basic features can be, for example, color of a text, size of a image, shape of a graphics, resolution of a video, etc. More advanced features can be, for example, sentiment of music, tone of a picture, emotion of a sentence, etc.

Figure 1:
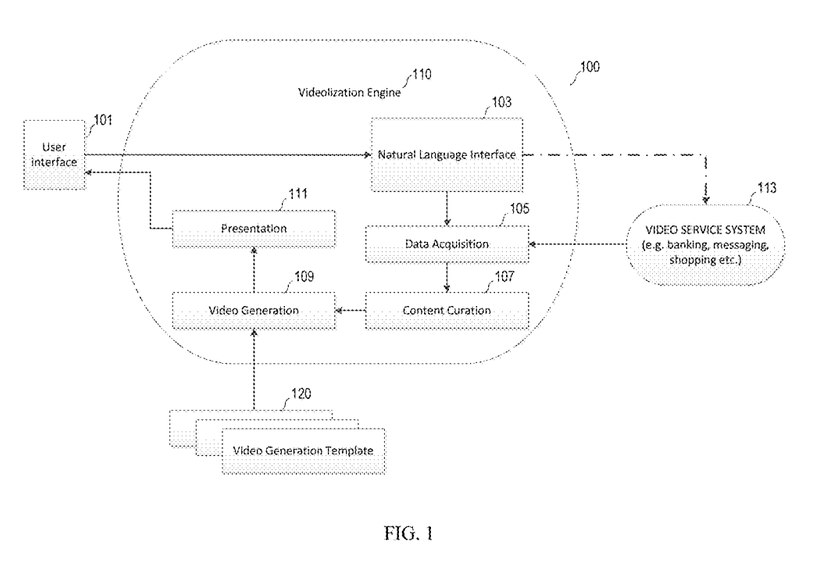
FIG. 1 shows a customizable video system according to an embodiment.

FIG. 1 shows a customizable video system 100 according to an embodiment. The customizable video system 100 in the embodiment shown includes a data acquisition component 105, a content curation component 107, a video generation component 109, a presentation component 111, and a user interface component 101. The customizable video system 100 can optionally include a natural language interface 103. The data acquisition component 105 in some embodiments is coupled to at least the user interface component 101 and the content curation component 107. The content curation component 107 may be additionally coupled to the video generation component 109, which may be coupled to the presentation component 111. The natual language interface 103 may be coupled to the video service system 113.

The user interface component 101 and the presentation component 111 can comprise separate components or can comprise an integrated unit. In some embodiments, the natural language interface 103, the data acquisition component 105, the content curation component 107, and the video generation component 109 comprises a videolization engine.

In addition, the customizable video system 100 can include one or more video generation templates. The one or more video generation templates comprise templates that can be used for processing, combining, and/or generating video portions. Further, the video generation templates 120 can be used for processing, combining, and/or generating data portions into video portions, including combining and/ or generating video, text, audio, image, or animation portions and/or any other suitable data.

The customizable video system 100 generates customizable video. A user can generate a customizable video using the customizable video system 100. The user can play and view the customizable video using the customizable video system 100, wherein the customizable video includes one or more selectable objects.

The user can select or indicate a selectable object in the customizable video, such as by highlighting the selectable object, placing a cursor or pointing element on or near the selectable cursor, determining the user's eye movements and/or gaze location, receiving an audible indication from the user, or other suitable indications. In response, the customizable video system 100 can re-generate the customizable video, obtaining and incorporating additional subject matter into the customizable video. The additional subject matter can be related to the selectable object that was selected or indicated by the user. As a result, the customizable video is quickly and easily modified by the customizable video system 100 and presented to the user. This occurs without the user having to manually find and obtain additional subject matter. This occurs without the user having to manually incorporate the additional subject matter.

User can modify the customizable video merely by selecting or showing interest in a selectable object or objects in the customizable video. The user can iteratively change or refine the customizable video by continuing to select selectable objects in the customizable video. The customizable video system 100 can regenerate the customizable video in real time or nearly real time. The customizable video system 100 can regenerate the customizable video during presentation of the customizable video to the user.

The user interface component 101 is coupled to the data acquisition component 105. The user interface component 101 can exchange communications with a user, including receiving user inputs, for example. The user inputs can comprise any suitable inputs, including mechanical inputs, audio inputs, optical inputs, electrical or magnetic inputs, or proximity sensor inputs, for example. Other input types are contemplated and are within the scope of the description and claims.

The presentation component 111 displays (i.e., presents) video to the user. The presentation component 111 can include a display screen or screens. The presentation component 111 can include a speaker or other audio generation component. The presentation component 111 can include other or additional components. It should be understood that the presentation component 111 can comprise an independent component or can be integrated with the user interface component 101 in some embodiments.

If the customizable video system 100 includes the natural language interface, a user can interact with the customizable video system 100 using the natural language interface 103. For example, in some embodiments the natural language interface 103 performs voice analysis and responds to voice inputs and voice commands from the user. In some embodiments, the natural language interface 103 generates audio instructions and/or audio feedback to the user.

The video generation component 109 generates customizable video. The video generation component 109 in some embodiments combines and/or integrates one or more portions to create customizable video. The one or more data portions comprise video portions in some embodiments. However, it should be understood that the one or more data portions can include other data, including images, animations, audio, text and other data portions.

The customizable video system 100, as part of generating a customizable video, can determine selectable objects in the customizable video. The customizable video system 100 can use a video generation template 120 for determining selectable objects in some embodiments. An object definition is generated for each determined selectable object in the customizable video.

The determining of selectable objects can include analysis of portions of the customizable video. The analysis for selectable objects can include natural language processing of voice audio in the customizable video. The analysis for selectable objects can include morphological analysis of the customizable video. The analysis for selectable objects can include semantic analysis of voice audio and/or text in the customizable video. The analysis for selectable objects can include video analysis of the customizable video. The analysis for selectable objects can include image analysis of images in the customizable video. The analysis for selectable objects can include audio analysis of the customizable video. The audio analysis can designate audio portions likely to be of interest to the user (or other viewers). The analysis for selectable objects can include sentiment analysis of the customizable video. The sentiment analysis can determine a sentiment being conveyed or attempted to be conveyed in the customizable video.

The content curation component 107 curates data portions for use in customizable videos. The content curation component 107 can store data portions. The content curation component 107 in some embodiments can process data portions, such as filtering, sharpening, changing lighting, color, or contrast of data portions, or otherwise processing and/or improving the data portions. The content curation component 107 in some embodiments organizes data portions. The content curation component 107 in some embodiments maintains data portions, including obtaining updates or changes to data portions. The content curation component 107 in some embodiments grades, ranks, or orders the data portions, wherein the customizable video system 100 can discriminate between and select a desired data portion from among multiple similar or interchangeable data portions.

The data acquisition component 105 obtains data portions to be used in customizable video. The data acquisition component 105 in some embodiments can search for data portions to be obtained.

A video generation template 120 comprises a construct that can accept suitable input data and filter out unacceptable or undesired input data. A video generation template 120 comprises a construct that can convert input data into a usable or preferred data format or formats. A video generation template 120 comprises a construct that can improve or optimize data portions. A video generation template 120 comprises a construct that can combine data portions. A video generation template 120 comprises a construct that can determine whether any selectable objects are included in the data portions.

A video generation template 120 may include data reception rules or functions. A video generation template 120 may include data processing rules or functions. A video generation template 120 may include video generation rules or functions. Consequently, a video generation template 120 can be used to receive data portions, process data portions, combine data portions, and include and/or designate selectable objects in a customizable video.

In operation, the customizable video system 100 receives user inputs and/or commands to generate a customizable video. The customizable video system 100 provides a video generation template or templates to a user. The customizable video system 100 obtain one or more data portions and uses the one or more video generation templates to combine the one or more video portions and generate the customizable video. In addition, the customizable video system 100 can use the one or more video generation templates to process data portions in any suitable manner. Further, the customizable video system 100 can use the one or more video generation templates to determine one or more selectable objects in the customizable video. The customizable video system 100 determines the one or more selectable objects in the customizable video using one or more object definitions. The customizable video system 100 receives an indication indicating a user selection of at least one selectable object corresponding to an object definition, obtains additional data portions related to the at least one selectable object corresponding to the indication, and regenerates the customizable video using the additional data portions and the one or more data portions corresponding to the indication.

The video generation system 100 provides a video generation template to a user and to interact with the user through a natural language interface 103. A videolization engine 110 comprises a natural language interface 103, a data acquisition module 105, a content curation module 107, a video generation module 109, and a presentation module 111. The videolization engine 110 is configured to interact with a user using the natural language interface 103 in some embodiments.

In some embodiments, the data acquisition module 105 may collect data, such as, product images and videos, through other search engines and/or sources. The content curation module 107 may select the data, prepare the scenes of the video, and generate an extensible markup language (XML) file that includes the object definitions. The XML file and the data are passed to the video generation module. The video generation module 109 may generate audio files with a text-to-speech engine, combine the audio files with visuals, and apply animations or effects to compose a video. The video is presented to the user through the presentation module. Generated videos differ from manually produced videos in terms of customizability. Such video generating system 100 may contact with a service video system through natural language interface 103 or data acquisition module 105. In some embodiments, the data acquisition module 105 collects data from a service module, for example, a shopping agent, which provides a comparison of product features and prices from a plurality of retailers. Such video generation system 100 can be used for example in a shopping system to present a product comparison to users. In accordance with product search by a customer, a video can be generated from the system. Such system can also be used in video ring back tone cases to provide video tone for a client; or a banking videolization system that uses a videolization engine in order to automatically produce personal finance and banking videos personalized for the user; or an instant messaging system that the user composes messages through the natural language interface of the videolization engine, which may directly pass this message to the instant messaging service.

Figure 2:
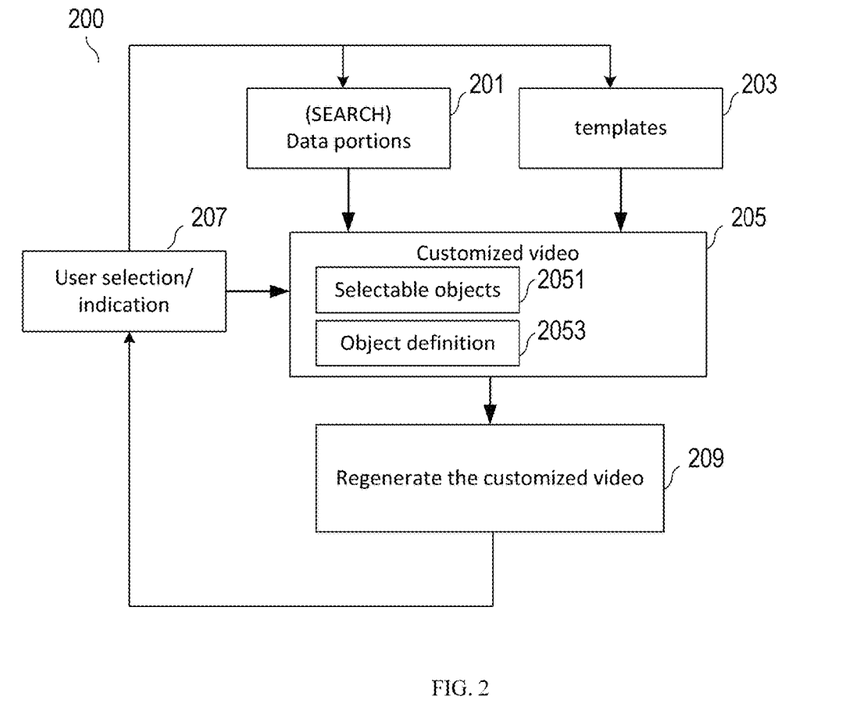
FIG. 2 shows an embodiment of a method for interactive video generation.

FIG. 2 shows an embodiment of a method for interactive video generation 200. The method includes obtaining one or more data portions 201 and generating a customizable video using the one or more data portions and using one or more video generation templates 203; determining one or more selectable objects 2051 in the customizable video 205 using one or more object definitions 2053; receiving an indication indicating a user selection 207 of at least one selectable object 2051 corresponding to an object definition 2053; obtaining additional data portions related to the at least one selectable object 2051 corresponding to the indication 207; and regenerating 209 the customizable video 205 using the additional data portions and the one or more data portions 201 corresponding to the indication 207.

Data portions may comprise any data that can be incorporated into a video. A data portion may be of any size or length. A data portion in some embodiments may be a smallest element that can be searchable from internet or some other resources. For example, a number, a grouping of words, a file, a keyword, a picture, a portion of audio, etc. However, the above examples are given merely for illustration and are not limiting or exhaustive.

An indication indicates a user selection of the selectable object. The indication might be given by a user or a machine to show an instruction that is "understood" by the video generation program platform or the video generation system.

A selectable object comprises an object in a customizable video that a user can select or otherwise indicate. The selectable object may be a segment of audio clip, video clip, an image, a piece of graphics and/or text, or a combination of the elements that may be selected as an object to be worked on for further purpose, for example to be selected for the purpose of instructing the player to playback another segment of video that is relevant to the object. A whole video or a segment of video can also be a selected object.

An object definition may be a definition describing associated information of an object. The features of the object can be a color, size, shape, etc. The object definition may have for example, (1) metadata of the object, such as additional description, author, version number, copyright information, price, a relevant descriptive information or any other suitable information about the object, (2) instruction about enabled or permitted interactions, e.g., "click" and show Web URL, "mouse on" and show overlay some metadata, "press button 1" and execute some program or call some API and so on.

Determining the one or more selected objects may further include extracting media element features from the one or more data portions. Determining the one or more selected objects may further include labeling various levels of the media element features with the one or more object definitions. Determining the one or more selected objects may further include labeling a media element feature of the various levels of the media element features as a selectable object.

The object definition may be defined in a file, such as in an extensible markup language (XML) file, for example. Consequently, when a selectable object is selected or indicated by the user, the corresponding XML file can be transferred or accessed by components of the video generation system 100. The indication may comprise a video description file that adds an object definition into a video description file.

The method may further include updating the customizable video according to scheduling by a user.

The method may further include determining more selectable objects using more object definitions after regenerating the customizable video.

Videolization converts Internet content and/to other content into personalized and user-friendly video content that can be viewed on TVs, mobile devices, PCs, car computers, or any other suitable device. Videolization may allow a user to watch and listen to the Internet instead of having to read individual web pages. By such doing, internet public resource can be better appreciated by a user. By providing an embodiment, a user may receive contents either in a passive way or control and customize that content. Internet contents may be categorized based on the sources and types of the contents. Each category can be presented as a separate channel in the system. For example, a social network Internet website comprising multiple web pages may be presented as a single channel and posts from that website may be presented as episodes.

Figure 3:
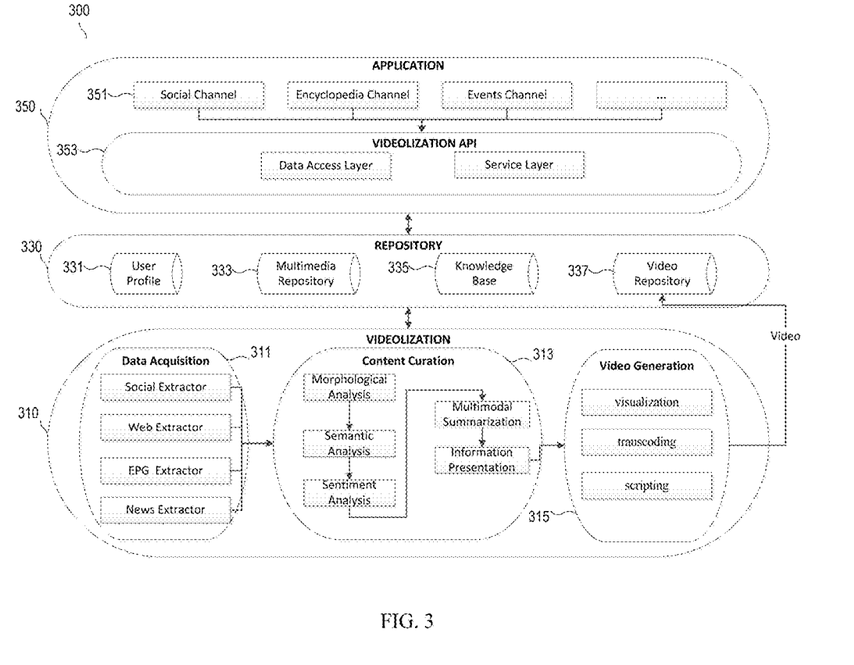
FIG. 3 shows an embodiment of the video generation system working in a cloud service.

FIG. 3 shows an embodiment of the video generation system working in a cloud service. A videolization Cloud Services system 300 comprises a videolization layer 310, a repository layer 330, and an application layer 350. Layers are designed in an object-oriented fashion considering software design principles. The layers are integrated through application programming interfaces (APIs) which can be implemented as Internet services such as Simple Object Access Protocol (SOAP) and Representational State Transfer (REST). Other protocols may also be employed as would be appreciated by one of ordinary skill in the art.

The videolization layer 310 comprises a data acquisition module 311, a content curation module 313, and a video generation module 315. The data acquisition module 311 comprises a social extractor, a web extractor, an Electronic Program Guide (EPG) extractor, and a news extractor. In an embodiment, the social extractor, the web extractor, the EPG extractor. Various categories (e.g., social media, news, and products) and formats (e.g., XML, Hypertext Markup Language (HTML), images, and video) of data may be collected and videolized. The content curation (CC) component 313 comprises morphological analysis, semantic analysis, sentiment analysis, multimodal analysis, voice recognition, heuristic rules, algorithms and information presentation.

Content curation module 313 as having been described in the application may refer to the process of collecting, organizing, and displaying information relevant to a particular topic. The object definitions may be carried out by the CC component 313.

The video generation component 315 comprises a visualization module, a transcoding module, and a scripting module. Visualization module generates 3D video content by using directives provided by the CC component 313. Transcoding module decodes gathered multimedia content which will be used by visualization module and encodes the output of the same module to a desired format. Scripting module provides action and director type scripts to be used by visualization module and deals with the integration of scripts with other modules. The scripting module provides an API using JavaScript technology. Third party developers can add their own audiovisual animations, action, and director templates to the system using the API. Action scripts are JavaScript directives for common action animations such as tweening, rotation, scaling, and translation. Third party developers can use provided predefined scripts or add their own animations to the action script database. Director scripts parse CC directives and generate a video timeline that describes where, when, and how to present contents gathered from web according to predefined templates. Third party developers can use predefined scripts or add their own scripts according to their intentions. The videolization layer 310 performs transformation of the acquired structural content (e.g., social feeds and web pages) into a video format using NLP, image processing, and computer graphic technologies. The repository layer 330 comprises a user profile, a multimedia repository, a knowledge base, and a video repository. The multimedia repository stocks basic multimedia content which are in video generation and the video repository stores the generated videos. The application layer 350 comprises a videolization API 353 and the various channels 351 previously described. The application layer 350 holds high-level services including, but not limited to, integration with external websites for data extraction and user interfaces for channels. In an embodiment, the software is implemented in C++ for image and video processing modules and in Java. Videolization Cloud Services system holds a database for predefined animation and director scripts written in JavaScript and enables third party developers to add their own scripts to the system. Furthermore, commercial and open-source software development and management tools including, but not limited to, OpenCV for image and video processing and OpenNLP for NLP, may be used.

Figure 4:
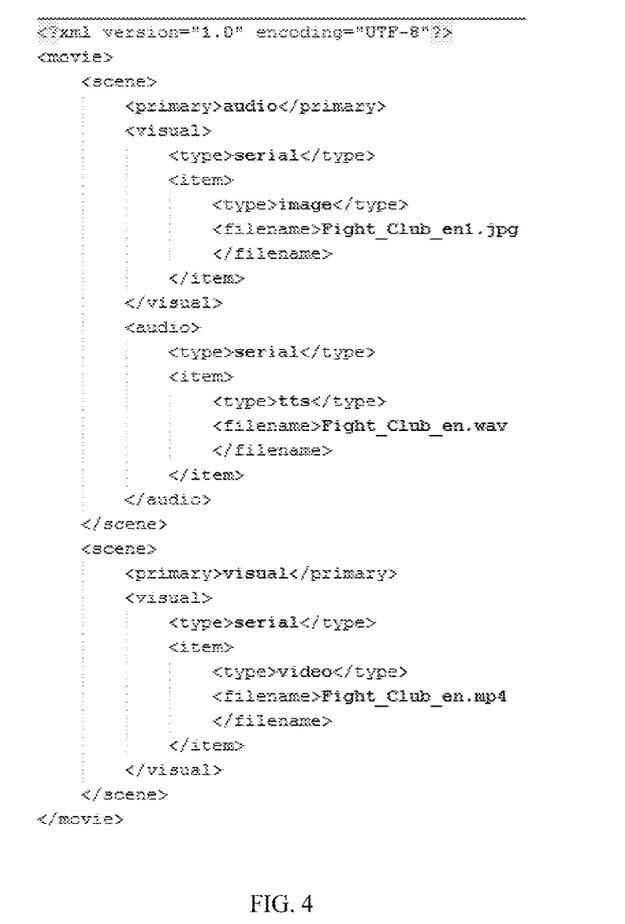
FIG. 4 shows an embodiment for a videolization video description language file.

FIG. 4 shows an embodiment for a videolization video description language file. A visualization of screenplays system comprises a content curation module to create screenplay XML data for a video generation module. The content curation module directs the visualization of screenplays system and determines how to present extracted Web content to individual TV audience. The content curation module supports natural language processing, semantic web, multimodal summarization, and personalization research challenges. The final output of Content Curation module is an XML file referred to as a videolization Video Description Language which defines the content of a generated video. The Video description language comprises of a plurality of scene elements. Each scene element may comprise of a text, visual (image and video), and audio items.

Figure 5:
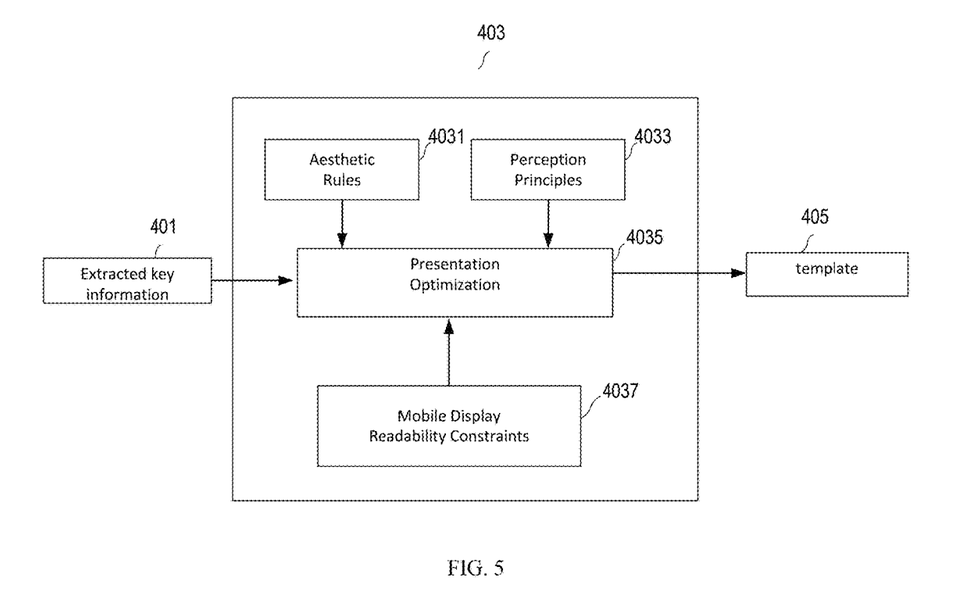
FIG. 5 shows an embodiment of a generation process of a video generation template.

FIG. 5 shows an embodiment of a generation process of a video generation template. Key information 401 that is considered useful may be extracted from the data acquisition module. In the content curation module various rules or principles are studied in various modules such as aesthetic rules module 4031, perception principles module 4033, presentation optimization module 4035, or mobile display readability constraints module 4037 may be considered to generate a video template 405 so that later video may have reference on the video template. A video generation module converts the output of the Content Curation module (e.g., XML content) to video by using image and video processing. The Video generation module edits the video functionalities, such as, scaling, resizing, and filtering during the conversion process. For example, all received visual, audio and text contents are regarded as actors and a director script assigns roles to the actors by parsing and interpreting the XML generated by content curation module. This action scripts define entrance and exit times of individual actors as well as their corresponding actions at each execution time step.

Another embodiment is provided. A video processing device includes a data acquisition module that obtains one or more data portions and generates a customizable video using the one or more data portions and using one or more video generation templates; a determining module that determines one or more selectable objects in the customizable video using one or more object definitions; a receiver that receives an indication indicating a user selection of at least one selectable object corresponding to an object definition; the data acquisition module that obtains additional data portions related to the at least one selectable object corresponding to the indication; and regenerate the customizable video using the additional data portions corresponding to the indication.

The video processing device can carry the above-mentioned method by matching the embodiments with different elements or modules in the video processing device.

Figure 6:
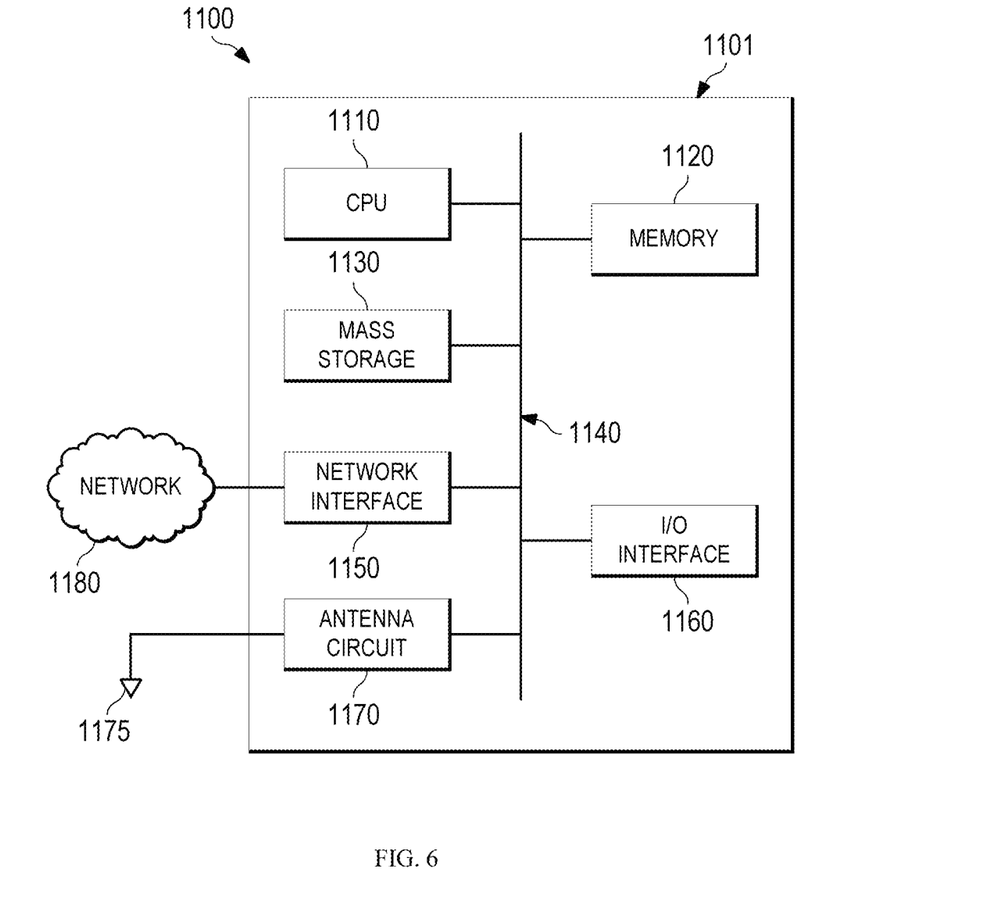
FIG. 6 shows a computing platform that may be used for implementing, for example, the devices and methods described herein, in accordance with any embodiment.

FIG. 6 shows a computing platform 1100 that may be used for implementing, for example, the devices and methods described herein, in accordance with any embodiment. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1101 in the embodiment shown comprises a processing unit equipped with one or more input/output devices, such as a speaker, microphone, mouse, touchscreen, keypad, keyboard, printer, display, and the like (not shown). The processing unit 1100 may include a central processing unit (CPU) 1110, memory 1120, a mass storage device 1130, and an I/O interface 1160, connected to a bus 1140.

The bus 1140 may be one or more of any type of several bus architectures including a memory bus or memory controller, a peripheral bus, video bus, or the like. The CPU 1110 may comprise any type of electronic data processor. The memory 1120 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs.

The mass storage 1130 may comprise any type of non-transitory storage device configured to store data, programs, and other information and to make the data, programs, and other information accessible via the bus. The mass storage 1130 may comprise, for example, one or more of a solid state drive, hard disk drive, a magnetic disk drive, an optical disk drive, or the like.

The I/O interface 1160 couples external input and output devices to the processing unit 1100. As illustrated, examples of input and output devices include a display and a mouse/keyboard/printer (not shown) coupled to the I/O interface 1160. Other devices may be coupled to the processing unit 1100, and additional or fewer interface devices may be utilized. For example, a serial interface such as Universal Serial Bus (USB) (not shown) may be used to provide an interface for a printer.

The processing unit also includes one or more network interfaces 1150, which may comprise wired links, such as an Ethernet cable or the like, and/or wireless links to access nodes or different networks 1180. The network interface 1150 allows the processing unit to communicate with remote units via the network 1180. For example, the network interface 1150 may provide wireless communication via one or more transmitters/transmit antennas 1170 and one or more receivers/receive antennas. In an embodiment, the processing unit is coupled to a local-area network or a wide-area network for data processing and communications with remote devices, such as other processing units, the Internet, remote storage facilities, or the like.

For example, a video processing device is provided according to an example. The device includes a memory storing instructions; and a processor coupled to the memory, with the processor reading and executing the instructions to obtain one or more data portions and generate a customizable video using the one or more data portions and using one or more video generation templates, determine one or more selectable objects in the customizable video using one or more object definitions, receive an indication indicating a user selection of at least one selectable object corresponding to an object definition, obtain additional data portions related to the at least one selectable object corresponding to the indication, and regenerate the customizable video using the additional data portions corresponding to the indication.

People can upload videos they generate to their own channels and create and reach out their own audiences anytime, anywhere.

For example, a user connects to one or more social media platforms and according to the user's request, the social media video system collects the data from the pre-defined and authorized social media platforms.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for generating video, comprising:
   obtaining one or more data portions and generating a customizable video using the one or more data portions and using one or more video generation templates;
   defining in the one or more video generation templates, for one or more of the data portions, respective entrance and exit times and one or more respective actions wherein each of the actions is associated with a respective time step;
   generating one or more object definitions for each identified selectable object in the customizable video;
   identifying one or more selectable objects in the data portions using the one or more object definitions and the one or more video generation templates;
   receiving an indication of user selection of one or more of the selectable objects;
   obtaining additional data portions related to the selected selectable objects; and
   regenerating the customizable video using the one or more data portions and the additional data portions corresponding to the selected selectable objects and using the one or more video generation templates.

2. The method of claim 1, wherein the identifying the one or more selectable objects further comprises:
   extracting media element features from the one or more data portions;
   labeling various levels of the media element features with the one or more object definitions;
   labeling a media element feature of the various levels of the media element features as a selectable object.

3. The method of claim 1, wherein the one or more object definitions are obtained in an extensible markup language (XML) file in the indication.

4. The method of claim 1, wherein the one or more object definitions further comprise results of an analysis based on the one or more of the selectable object, wherein the analysis is made in at least one of natural language processing, morphological analysis, semantic analysis, video analysis, audio analysis or sentiment analysis; and the selectable object comprises at least one of a text, image, an audio item or a video item.

5. The method of claim 1, further comprising:
generating a video description file based on the indication; and
compiling the object definitions into the video description file using the video description file.

6. The method of claim 1, further comprising:
updating the customizable video according to a scheduling input.

7. The method of claim 1, the method further comprising regenerating the customizable video during presentation of the customizable video.

8. The method of claim 1, wherein the indication is received during a playback of the customizable video.

9. The method of claim 1, further comprising:
identifying more selectable objects using more object definitions after regenerating the customizable video.

10. The method of claim 1, further comprising:
determining the data portions comprise the one or more selectable objects according to a construct in the video generation template.

11. A video processing device, comprising:
a memory storing instructions; and
a processor coupled to the memory, with the processor reading and executing the instructions to:
obtain one or more data portions and generate a customizable video using the one or more data portions and using one or more video generation templates;
define in the one or more video generation templates, for one or more of the data portions, respective entrance and exit times and one or more respective actions wherein each of the actions is associated with a respective time step;
generate one or more object definition for each identified selectable object in the customizable video;
identify one or more selectable objects in the customizable video using the one or more object definitions and the one or more video generation templates;
receive an indication of user selection of one or more of the selectable objects;
obtain additional data portions related to the selected selectable objects; and
regenerate the customizable video using the one or more data portions and the additional data portions corresponding to the selected selectable objects and using the one or more video generation templates.

12. The device of claim 11, wherein to identify the one or more selectable objects further comprises:
to extract media element features from the one or more data portions;
to label various levels of the media element features with the one or more object definitions;
to label a media element feature of the various levels of the media element features as a selectable object.

13. The device of claim 11, wherein one or more object definitions are obtained in an extensible markup language (XML) file in the indication.

14. The device of claim 11, wherein the one or more object definitions further comprise results of an analysis, wherein the analysis is performed based on the one or more of the selectable object and comprises at least one of natural language processing, morphological analysis, semantic analysis, video analysis, audio analysis, sentiment analysis, or combinations thereof, and wherein the selectable object comprises at least one of a text, image, an audio item, a video item, or combinations thereof.

15. The device of claim 11, further comprising:
generating a video description file based on the indication; and
compiling the object definitions into the video description file using the video description file.

16. The device of claim 11, further comprising to update the customizable video according to a scheduling input.

17. The device of claim 11, further comprising to regenerate the customizable video during presentation of the customizable video.

18. The device of claim 11, wherein the indication is received during a playback of the customizable video.

19. The device of claim 11, further comprising to identify more selectable objects using more object definitions after the customizable video is regenerated.

20. The device of claim 11, further comprising determining the data portions comprise the one or more selectable objects according to a construct in the video generation template.

* * * * *